United States Patent [19]

Tomoi et al.

[11] Patent Number: 5,518,627
[45] Date of Patent: May 21, 1996

[54] METHOD FOR TREATING WATER OR AN AQUEOUS SOLUTION

[75] Inventors: Masao Tomoi, Yokohama; Teruo Onozuka; Manabu Shindo, both of Sendai; Hideaki Kiniwa, Yokohama; Hirohisa Kubota, Yokohama; Shintaro Sawada, Yokohama, all of Japan

[73] Assignees: Mitsubishi Chemical Corporation, Tokyo; Tohoku Electric Power Co., Inc., Sendai, both of Japan

[21] Appl. No.: 396,795

[22] Filed: Mar. 1, 1995

[30] Foreign Application Priority Data

Mar. 1, 1994 [JP] Japan .................. 6-031420
Mar. 1, 1994 [JP] Japan .................. 6-031422

[51] Int. Cl.⁶ .................................................. C02F 1/42
[52] U.S. Cl. .................. 210/682; 210/683; 210/900; 210/917
[58] Field of Search .................. 210/682, 683, 210/684, 685, 686, 900, 917; 521/25, 30, 32

[56] References Cited

U.S. PATENT DOCUMENTS

| | | | |
|---|---|---|---|
| 4,029,609 | 6/1977 | Tanaka et al. | 521/30 |
| 4,052,343 | 10/1977 | Cunningham | 521/32 |
| 4,694,044 | 9/1987 | Kiniwa | 525/178 |
| 4,820,421 | 4/1989 | Auerswald | 210/685 |
| 4,851,382 | 7/1989 | Kusano et al. | 502/401 |
| 5,096,971 | 3/1992 | Nishikaji et al. | 525/278 |
| 5,314,974 | 5/1994 | Ito et al. | 526/206 |
| 5,350,523 | 9/1994 | Tomoi et al. | 210/683 |
| 5,369,132 | 11/1994 | Ito et al. | 521/31 |

*Primary Examiner*—Ivars Cintins
*Attorney, Agent, or Firm*—Oblon, Spivak, McClelland, Maier & Neustadt

[57] ABSTRACT

A method for demineralizing water or an aqueous solution, which comprises contacting the water or the aqueous solution to be treated to a strongly basic anion exchanger made of a crosslinked polymer having a constituting unit of the following formula (I):

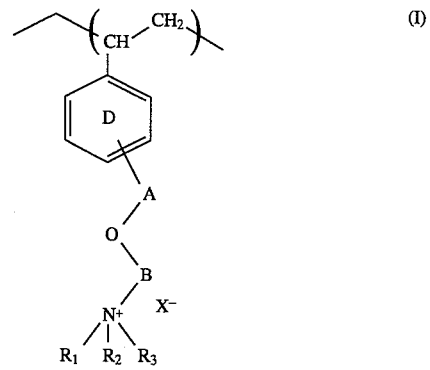

wherein A is a $C_{1-2}$ linear alkylene group, B is a $C_{4-8}$ linear alkylene group, each of R1, R2 and R3 which may be the same or different, is a $C_{1-4}$ alkyl group or a $C_{2-4}$ alkanol group, X is a counter ion coordinated on the ammonium group, and the benzene ring D may have an alkyl group or a halogen atom as a substituent.

9 Claims, No Drawings

METHOD FOR TREATING WATER OR AN AQUEOUS SOLUTION

The present invention relates to a method for removing an anionic substance, negatively charged microparticles, a colored substance, a radio active substance or silica in water by means of an anion exchange resin having certain specific ion exchange groups. Particularly, it relates to a method suitable for cleaning hot water from an electricity generating installation, radio active waste water, or warm or hot water discharged from e.g a sugar solution production process or an extra pure water production process.

A method for demineralizing water by means of a strongly basic anion exchanger is commonly used. Heretofore, as anion exchangers, strongly basic anion exchangers have been known wherein anion exchange groups such as quaternary ammonium groups or phosphonium groups, are introduced to a skeletal structure of e.g. polystyrene, poly(meth)acrylate, polyvinly alcohol or polyvinyl/aryl amine. Among them, an anion exchanger made of a crosslinked polymer comprising trimethylaminomethylstyrene as a structural unit, is widely used, since it is excellent in chemical stability and inexpensive.

However, the styrene type strongly basic anion exchanger comprising trimethylaminomethylstyrene has had many problems such that it is not necessarily chemically stable since under a higher temperature condition than room temperature, the trimethylamine is likely to be detached, thus leading to deterioration of the neutral salt splitting capacity, or the methyl group is likely to be detached, so that the exchanger tends to be weakly basic, and when it is used at a high temperature, the effective life of the resin is short, the trimethylamine is liberated to create an amine odor, and eluting substances from the anion exchanger are substantial. Accordingly, the useful temperature of the conventional styrene type strongly basic anion exchanger has been limited to a level of not higher than 60° C.

A styrene type anion exchange resin is also known, in which instead of the trimethyl ammonium, a ω-hydroxyalkyldimethyl ammonium group is used as the ion exchange group. However, it has been reported that such a resin is inferior in the heat resistance (The 48th International Water Conference (1992) IWC-87-9).

Further, an anion exchanger comprising, as a constituting unit, triethylaminoethyl (meth)acrylate having a terminal trimethyl ammonium group, is also known, but such an anion exchanger has also been reported to be poor in the heat resistance (IWC-87-9).

One of the present inventors has previously proposed a strongly basic anion exchanger in which a benzene ring and an ion exchange group are bonded by a polyalkylene chain, as a means to improve the heat resistance of the anion exchange group (Japanese Unexamined Patent Publication No. 349941/1992). In this case, if the polyalkylene chain is an ethylene chain, the Hofmann degradation (E2 leaving reaction) is likely to take place, whereby the heat resistance is poor. Accordingly, in order to suppress the leaving reaction of trimethylamine, the alkylene chain is required to be a propylene chain or a higher alkylene chain. However, to produce this anion exchanger, the alkylene chain is introduced by a Grignard reaction (J. Amer. Chem. Soc., 96. 7101, (1974), Synth. Comm., 20 (15) 2349 (1990)), whereby production on an industrial scale is difficult and expensive. Further, since it is constituted by alkylene groups, the resulting anion exchanger will be a hydrophobic resin. Accordingly, the water content and the swelling degree of the resin are low.

An anion exchanger has also been reported wherein a 1,1-dimethylethylene chain having a dimethyl group introduced at the β-position of the ion exchange group in order to eliminate detachable hydrogen, is introduced. However, such an anion exchanger has been reported to be poor in the thermal stability of a trimethyl ammonium group because of a steric hindrance of two methyl groups (J. Appl. Polym. Sci., 8. 1659 (1964)).

Japanese Unexamined Patent Publication No. 350107/1991 discloses that the polystyrene polymer having $(CH_2)_n X(CH_2)_m NR1R2R3Y$ (wherein X is O, S, $SO_2$, etc, each of R1 to R3 is an alkyl group, n is 0 or 1, m is from 1 to 20, and Y is a physiologically acceptable counter ion) as a functional group is effective for lowering the human plasma cholesterol level. However, this publication discloses nothing about use of this polystyrene polymer as an anion exchange resin for water treatment. Likewise, a research has been reported in which a weakly basic anion exchanger made of a spherical copolymer of N,N-dimethylaminoethyl(or propyl)oxymethylstyrene with divinyl benzene, or its quaternary ammonium salt or amine oxide, is used as a phase transfer catalyst in cyanide displacement on 1-bromooctate (Chem, Lett., 677–678 (1980)). However, this report discloses nothing about water treatment.

It is a first object of the present invention to provide a method for demineralizing water or an aqueous solution by means of a crosslinked polymer having trialkyl ammonium alkoxyalkyl groups as ion exchange groups. A second object of the present invention is to provide a new anion exchanger which is particularly useful for a demineralization method for hot water, or radio active water or aqueous solution.

The first object of the present invention can be accomplished by a method for demineralizing water or an aqueous solution, which comprises contacting the water or the aqueous solution to be treated to a strongly basic anion exchanger made of a crosslinked polymer having a constituting unit of the following formula (I):

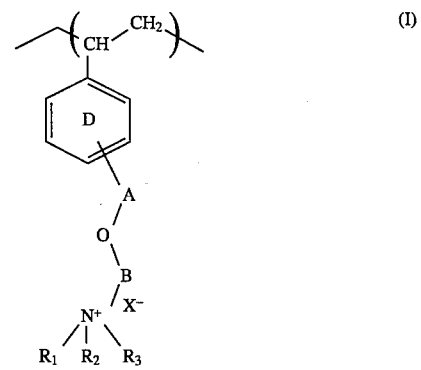

wherein A is a $C_{1-2}$ linear alkylene group, B is a $C_{4-8}$ linear alkylene group, each of R1, R2 and R3 which may be the same or different, is a $C_{1-4}$ alkyl group or a $C_{2-4}$ alkanol group, X is a counter ion coordinated on the ammonium group, and the benzene ring D may have an alkyl group or a halogen atom as a substituent.

The second object of the present invention can be accomplished by a novel anion exchanger of the formula (II-1):

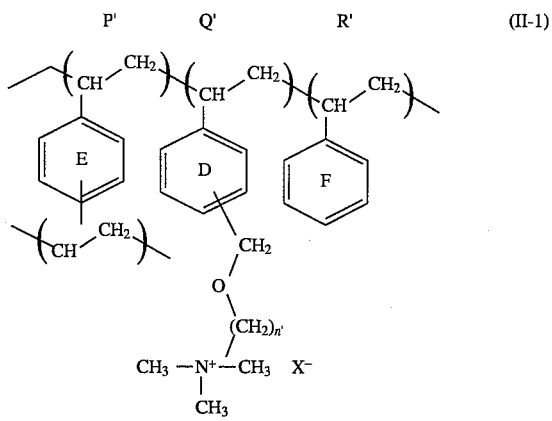

wherein n' is an integer of from 4 to 6, X is a counter ion coordinated on the ammonium group, and each benzene ring may be substituted by a methyl group or an ethyl group, and wherein the constituting unit Q' is from 10 to 99 mol %, the constituting unit P' is from 25 to 0.2 mol %, and the constituting unit R' is from 0 to 20 mol %, based on the crosslinked polymer.

Now, the present invention will be described in detail.

The anion exchanger to be used in the present invention is a water-insoluble crosslinked copolymer characterized in that it comprises a constituting unit of the formula (I).

The carbon number of the alkylene group B is required to be at least 4 to obtain adequate heat resistance of the ion exchange groups. No adequate heat resistance will be obtained by an ethylene chain or a propylene chain. However, if the chain length of the alkylene chain B becomes long, the molecular weight of the constituting unit (I) will be large, whereby the ion exchange capacity per unit weight of the anion exchanger decreases, thus leading to a decrease in the exchange capacity. Therefore, the carbon number of the alkylene chain B is preferably at most 8.

As the alkylene chain B, a linear alkylene group such as butylene, pentylene, hexylene, heptylene or octylene, may, for example, be mentioned.

On the other hand, the alkylene chain A bonded to the benzene ring is believed to have a function of preventing an oxidation reaction of the benzene ring. In the case of a phenoxy group where the carbon number of A is 0 (direct bond), the benzene ring is susceptible to oxidation, thus leading to detachment of the ion exchange group. However, like in the case B, if the chain length of A becomes long, the number of ion exchange groups per unit weight will decrease. Therefore, the carbon number of the alkylene chain A is preferably at most 2. It may, for example, be a methylene chain or an ethylene chain.

From the viewpoint of the production process and the production costs, the alkylene chain A is preferably a methylene chain or an ethylene chain, and the alkylene chain B is preferably a butylene chain.

Here, the alkylene chain B bonded to the ion exchange group is believed to contribute to improvement of the heat resistance, and the alkylene chain A bonded to the benzene ring is believed to contribute to suppression of oxidation of the benzene ring. Accordingly, the chain length of the alkylene chain B bonded to the ion exchange group is believed to be particularly important to obtain the heat resistance of the ion exchanger.

The alkoxyalkylene group having the ion exchange group is, in many cases, introduced to the p-position of the styrene residue in the production. Even when, this alkoxyalkylene group is introduced to the m-position or the o-position, there will be no substantial steric influence by the benzene ring and the polyethylene chain, since the distance between the ammonium group and the benzene ring is more than a few Å. Accordingly the alkoxyalkylene group having the ion exchange group may be substituted at any position of the benzene ring.

The anion exchanger to be used in the present invention can be prepared by various methods. There may be mentioned, for example, a method in which a precursor monomer of the following formula (III-1) (wherein A and B are as defined with respect to the formula (I), and Y is a functional group which can be converted to an ion exchange group, such as a halogen atom such as chlorine, bromine or iodine, or a tosyl group) is synthesized and polymerized in the presence of a crosslinking agent and, if necessary, together with a third monomer component, followed by a reaction with an amine to convert Y to an ammonium group, or a method wherein a monomer having structural unit of the formula (III-2) is polymerized together with a crosslinking agent, etc.

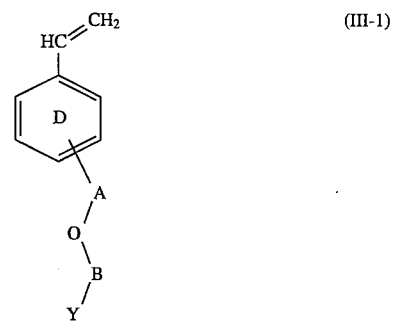

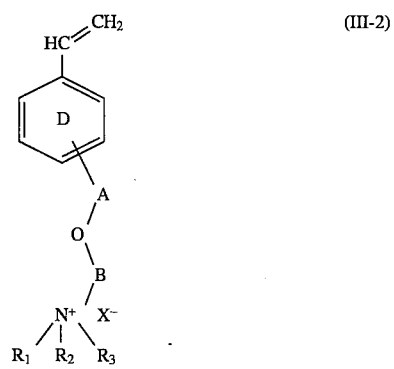

In the formula (III-2), A, B, R1 to R3, D and X are as defined above with respect to the formula (I). X is a counter ion coordinated on the ion exchange group, which may, for example, be a chloride ion, a bromide ion, an iodide ion, a sulfuric acid ion, a nitric acid ion or a hydroxyl group. In a case where the counter ion is a bivalent anion such as a sulfuric acid ion, one counter ion will be coordinated to two molecules of the repeating unit of the formula (I).

The polymerizable monomer as the precursor of the formula (III-1) can be prepared by several methods. For example, it can be prepared by a method wherein chloromethylstyrene, (which may be a mixture of m-form and p-form) is hydrolyzed in accordance with a conventional technique (Polymer, 1973, Vol. 14, 330–332, Markromol, Chem. Rapid Commun., 7, 143, 1986), and then a 1,ω-dihalogenoalkane is reacted thereto, or a method wherein chloromethylstyrene is reacted with tetrahydrofuran in the presence of mercury chloride (II) in accordance with a conventional technique (Bull. Chem. Soc. Jpn., 1976, Vol.

49, 2500) to obtain a ω-halogenoalkoxymethylstyrene. Further, a monomer (III-2) having an ammonium group can be prepared by amination of the monomer of the formula (III-1) with a tertiary amine. Of course, the benzene ring D in the general formula may be substituted by an alkyl group or a halogen atom.

The crosslinking agent useful for the production of the anion exchanger to be used in the present invention, may, for example, be a monomer having two or more unsaturated hydrocarbon bonds, such as divinyl benzene, polyvinyl benzene, an alkyldivinyl benzene, a dialkyldivinylbenzene, ethylene glycol polyacrylate or methacrylate, polyethylene glycol diacrylate or dimethacrylate, polyethylenebisacrylamide or methacrylamide, divinylbenzyl ether. The crosslinking agent may further be a by-product formed during the production of a monomer, such as a 1,ω-bisvinyl benzyloxyalkane or a 1,ω-bisvinylbenzene ethyloxyalkane. Particularly preferred is divinylbenzene. If the content of the crosslinking agent is low, the resulting anion exchanger tends to be a highly swellable polymer. On the other hand, if the content is high, the content of the constituting component (I) having the ion exchange group tends to be low, whereby the ion exchange capacity tends to be low. Accordingly, the amount of the crosslinking agent used for the preparation of the anion exchanger of the present invention, is usually such that the constituting unit derived from the crosslinking agent will be from 0.1 to 50 mol %, preferably from 0.2 to 25 mol %, in the anion exchanger.

In the present invention, a third unsaturated hydrocarbon bond-containing monomer may be employed in addition to the constituting unit of the formula (I) and the crosslinking agent, so long as the function of the anion exchanger will not thereby be reduced. Such a third polymerizable monomer may, for example, be styrene, an alkylstyrene such as methylstyrene or ethylstyrene, a polyalkystyrene, a (meth-)acrylate, (meth)acrylic acid, acrylonitrile, chloromethylstyrene, hydroxyalkoxyalkylstyrene, or a by-product formed during the production of a monomer. The third unsaturated hydrocarbon bond-containing monomer is used in such an amount that the constituting unit derived therefrom will be from 0 to 50 mol %, preferably from 0 to 20 mol %, based on the weight of the anion exchanger.

The anion exchanger to be used in the present invention is produced by polymerization of the above described monomer in accordance with a conventional method and then may be formed into various shapes. A spherical anion exchanger can be produced by suspension polymerization of water/oil type or oil/water type. It is preferred to conduct the suspension polymerization using a suspension of the above described monomers in the presence of a polymerization initiator so that the bath ratio will be 1:2 to 1:6. The average particle size of the anion exchanger in the present invention is usually within a range of from 100 µm to 2 mm. After the suspension polymerization, the product may be pulverized into a powder, as the case requires. Otherwise, by a solution polymerization, the product may be formed into a bulk form or a powder form. Further, it may be formed into various other forms such as a fiber form or a membrane form.

In such polymerization reactions, solvents capable of dissolving the above mentioned various monomer components may be added as the case requires. In a case where copolymerization is carried out with an addition of polar organic solvent such as toluene or hexane which is a poor solvent to such a monomer, it is possible to obtain an ion exchanger having a porous structure. On the other hand, when a good solvent such as tetrahydrofuran or 1,4-dioxane is added, a swellable anion exchanger can be obtained.

Depending upon the type and amount of such a solvent, the physical structure of the resulting porous polymer will be different. Accordingly, the desired porous polymer can be obtained by controlling such a solvent. Further, a solvent such as water, methanol, ethanol, acetone, or a mixture of such solvents, may be used. The amount of the solvent is usually within a range of from 0 to 200 wt %, based on the total monomers.

The monomer for the structural unit of the formula (I) is used in such an amount that the constituting unit of the formula (I) will be from 5 to 99.9 mol %, preferably from 10 to 99 mol %, in the anion exchanger. In this case, in order to increase the ion exchange capacity, the content of the structural unit of the formula (I) is preferably as high as possible. The exchange capacity (the neutral salt exchange capacity) per weight of the anion exchanger of the present invention varies also depending upon the molecular weight of the constituting element of the formula (I). Namely, it varies depending upon the alkylene chains A and B and substituents R1 to R3 of the ion exchange group. However, in general, the exchange capacity is usually within a range of from 0.2 to 5 meq/g. Here, meq/g represents milli equivalent per 1 g of the dry resin. More preferably, it is within a range of from 1.5 to 4.5 meq/g. The ion exchange capacity per volume varies depending upon the swelling degree, but is usually within a range of from 0.3 to 1.5 meq per ml of the Cl-form resin swelled with water (hereinafter represented by meq/ml).

The polymerization initiator may, for example, be a known peroxide polymerization initiator such as benzoyl peroxide (BPO), lauroyl peroxide or t-butylhydroperoxide, or an azo type polymerization initiator such as azobisisobutyronitrile (AIBN), 2,2'-azobis(2,4-dimethylvaleronitrile)(V- 65, tradename (Wako Junyaku)), or 2,2'-azobis (2-methylpropionamidine)·dihydrochloride (V-50, tradename (Wako Junyaku), water-soluble polymerization initiator). Such a polymerization initiator is used usually in an amount of from 0.1 to 5 wt %, based on the total monomer. The polymerization temperature varies depending upon the half life temperature and the amount of the polymerization initiator, the type of the monomer, etc. However, it is usually from 40° to 150° C., preferably from 50° to 100° C. The polymerization time is usually from 1 to 30 hours, preferably from 1 to 15 hours.

Conversion of Y in the polymerizable monomer of the formula (III-1) or in the crosslinked polymer obtained from such a monomer, to an ammonium group (—NR1R2R3) can be conducted by a conventional method. When Y is a halogen atom, it may be reacted with a tertiary amine in the presence of a suitable solvent to convert it to an ammonium group. Also when Y is a tosyl group, it may likewise be converted to an ammonium group by the above reaction.

When the ammonium group is to be introduced to Y in the polymer, it is common to add a solvent in order to let the resin swell. The solvent used for this purpose, may, for example, be water, an alcohol such as methanol or ethanol, a hydrocarbon such as toluene or hexane, a chlorinated hydrocarbon such as dichloromethane or 1,2-dichloroethane, an ether such as diethyl ether, dioxane or tetrahydrofuran, or other solvents such as dimethylformamide or acetonitrile. These solvents may be used alone or in combination as a solvent mixture. The reaction temperature varies depending upon the reaction system, the type of the functional group Y, the solvent, etc. However, it is usually within a range of from 20° to 100° C.

After introducing the ammonium group, the counter ion may be converted to various anion forms by conventional methods.

The benzene ring in the formula (I) may be substituted by an alkyl group or a halogen atom in addition to the alkyloxyalkylene group having the ion exchange group. The alkyl group may, for example, be a methyl group or an ethyl group, and the halogen atom may be chlorine, bromine or iodine.

Each of R1, R2 and R3 constituting the ion exchange group is a $C_{1-4}$ alkyl group or a $C_{2-4}$ alkanol group such as hydroxyethyl group. Also in this case, a methyl group is preferred in order to minimize the decrease in the exchange capacity per unit weight.

Preferably, the anion exchanger to be used for the method of the present invention is a crosslinked polymer comprising constituting units P, Q and R of the formula

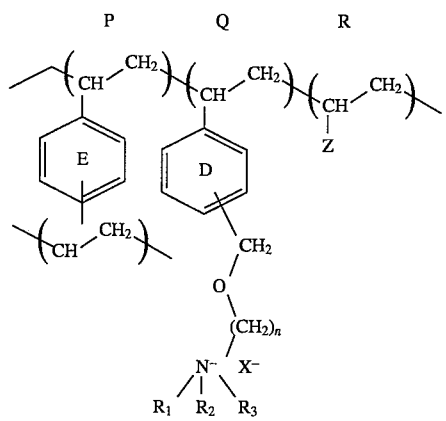

In the formula (II), n is an integer of from 4 to 8, each of R1, R2 and R3 which may be the same or different, is a $C_{1-4}$ alkyl group or a $C_{2-4}$ alkanol group, and X is a counter ion coordinated on the ammonium group. Each of the benzene rings D and E may be substituted by an alkyl group or a halogen atom, and

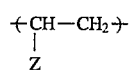

is a third polymerizable monomer residue. The constituting unit Q is from 5 to 99.9 mol %, the constituting unit P derived from the crosslinking agent is from 50 to 0.1 mol %, and the constituting unit R derived from the third polymerizable monomer is from 0 to 50 mol %, based on the crosslinked polymer. Particularly preferred is a crosslinked polymer represented by the formula (II-1):

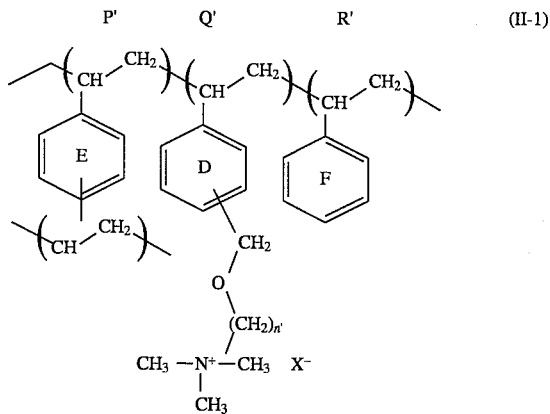

In the formula (II-1), n' is an integer of from 4 to 6, and X is a counter ion coordinated to the ammonium group. Benzene ring F may be substituted by a methyl group or an ethyl group. The constituting unit Q' is from 10 to 99 mol %, the constituting unit P' is from 25 to 0.2 mol %, and the constituting unit R' is from 0 to 20 mol %, based on the crosslinked polymer. This anion exchanger is a novel polymer. In particular, a crosslinked polymer of the formula (II-1) wherein n' is 4, is practically useful as an anion exchanger, since it can be synthesized from a raw material which is readily available on an industrial scale, and it has a large neutral salt splitting capacity per unit weight.

The polymer of the formula (II) or (II-1) may sometimes be crosslinked by impurities in the monomer, such as a 1,ω-bisvinylbenzyloxyalkane.

The method of the present invention is carried out by contacting water or an aqueous solution to the anion exchanger made of the crosslinked polymer having a constituting unit of the formula (I). For the contacting method, a conventional water treatment method may be employed. For example, contacting can be carried out by a batch system, a semibatch system, a continuous system or a semicontinuous system employing e.g. a fluidized bed, an agitation tank, a batch tank or a parallel flow or counter current flow column.

The contact time of the water to be treated to the anion exchanger may be selected within a wide range depending upon the exchange capacity of the anion exchanger, the amount of the ion exchanger, the amount of the anionic substances in the water to be treated, the contact temperature, etc. The temperature of the water to be treated may be selected within a wide range of from 0° to 150° C. The anion exchanger used in the method of the present invention is particularly excellent in the heat resistance and is stable even in hot water of 60° C. or higher at which a conventional anion exchanger comprising trimethylammoniummethylstyrene as the constituting unit will readily deteriorate, and it is capable of exhibiting the performance over a long period of time without losing the ion exchange ability.

Accordingly, the method of the present invention is particularly effective for treatment of hot water of 60° C. or higher. The method of the present invention may be effectively applied to the treatment of water from an electricity generating installation.

In an electricity generating installation, demineralization treatment or water cleaning treatment is required for various hot water and ambient temperature water to be used as a heat exchanging medium or a medium for energy conversion. For example, nuclear reactors used for nuclear-power generation include a boiling water reactor (BWR) and a pressurized water reactor (PWR). The former is of the type wherein cooling water is heated by the nuclear reactor to convert it to steam, which is directly supplied to a turbine, and the latter is of the type wherein primary cooling water is heated by the nuclear reactor and supplied to a steam generator, and in the steam generator, the secondary cooling water is heated to convert it to steam, which is then supplied to a turbine.

In either one of the above nuclear reactors, a condensate demineralizer for cooling water of the nuclear reactor, packed with an ion exchange resin, is installed in the recycling system of the cooling water, to ensure the removal of radioactive substances from the reactor water and to improve the purity of the water.

Further, ion exchange resin treatment during a temperature rise of water or when water is hot, is carried out also in e.g. a demineralizing tower for removal of boric acid, a recovery apparatus for boric acid, a cleaning apparatus for water of used fuel pool, or a condensate demineralizer other than the one described above.

Furthermore, a condensate demineralizer is installed also for e.g. a boiler of a large scale circulation type in thermal power generation.

With respect to heat resistance of conventional ion exchange resins, the maximum temperature for use of a H-form cation exchange resin is usually 120° C., and that of a OH-form anion exchange resin is usually 60° C. Therefore, in a demineralization apparatus using combination of these ion exchange resins, if hot water of 60° C. or higher is treated for a short period of time or a long period of time, the ion exchange resin undergoes deterioration of the performance, and the demineralization performance decreases. Accordingly, in treatment of various hot water in various installations for power generation, hot water of 60° C. or higher is required to be cooled to a temperature lower than 60° C. (usually at most 50° C.) before treatment.

According to the method of the present invention, hot water of a temperature of from 60° to 120° C. can be treated by the ion exchange treatment without necessity to preliminarily cool it, whereby it is possible to reduce heat loss and to avoid deterioration of the performance of the anion exchanger due to a heat shock.

Further, a condensate in a nuclear power generating installation or waste water for various waste treatments derived from a nuclear reactor contains radioactive substances in many cases, and the anion exchanger to be used for treatment of such water is exposed to radiation, whereby it will be deteriorated, and its ion exchange ability will decrease. Thus, the useful life of the resin will be shortened, and the amount of the waste resin will increase.

However, with the anion exchanger used for the method of the present invention, deterioration due to radiation is less as compared with a conventional ion exchange resin of trimethylammoniummethylstyrene type, and the ion exchange ability lasts over a longer period of time.

Further, the anion exchanger for water treatment in an electricity generating installation is required to have an ability to remove silica. Here, silica includes colloidal silica. The anion exchanger to be used for the method of the present invention is excellent also in the ability for removal of silica.

The treating method of the present invention is useful not only for water treatment in the electricity generating installation but also for decoloring various colored solutions such as a high temperature colored solution discharged from the sugar production industry. Likewise, it is useful also for treatment of radioactive waste water discharged from various chemical installations, medical plants, etc.

With the anion exchanger used for the method of the present invention, elution of resin components is very little. Accordingly, the method of the present invention is suitable for a process for producing e.g. extrapure water, water for medical use or drinking water.

The method of the present invention is useful not only for treatment of hot water but also for treatment of low temperature or ambient temperature water, whereby the anion exchanger is scarcely susceptible to heat deterioration, and the ion exchange ability can be maintained over a long period of time.

Now, the present invention will be described in further detail with reference to Examples. However, it should be understood that the present invention is by no means restricted by such specific Examples.

PREPARATION EXAMPLE 1

Preparation 1 of 4-bromobutoxymethylstyrene

Into a 300 ml four-necked flask, 20 g (0.5 mol) of sodium hydroxide and 20 ml of water were added and stirred to obtain a uniform solution. The temperature of solution was returned to room temperature, and then 13.42 g (0.1 mol) of vinyl benzyl alcohol (a mixture of m-form and p-form), 32.39 g (0.15 mol) of 1,4-dibromobutane and 3.22 g (0.01 mol) of tetrabutylammonium bromide were dissolved in 100 ml of toluene and added thereto. This mixed solution was reacted at 60° C. for 6 hours with vigorous stirring. After the reaction, the solution was separated and thoroughly washed with water. This organic phase was dried over magnesium sulfate, and then toluene was distilled off under reduced pressure. The solution thereby obtained was subjected to vacuum distillation (b.p. 125° to 128° C./16 Pa) in the presence of DPPH (1,1-diphenyl- 2-picryl-hydrazyl) to obtain a colorless pale yellow transparent liquid. The obtained liquid was confirmed to have structure of 4-bromobutoxymethylstyrene, since it has the following $^1$H-NMR, $^{13}$C-NMR and IR absorption. The obtained amount was 15.0 g, and the yield was 56%.

1H-NMR was measured by EX=270 manufactured by JEOL (270 MHz, the solvent was $CDCl_3$ in all cases; TMS standard δ: ppm; since this compound is a mixture of m-form and p-form, the bond constant can not be calculated), and the infrared absorption spectrum (IR spectrum) was measured by FT-IR 4000 manufactured by Shimadzu Corporation. (in the bracket (), br. means that the line width is broad, sh. means "sharp", str. means "strong absorption", and med. means "medium absorption").

1H-NMR; 7.15–7.36 (m: aromatic hydrogen), 6.61– 6.73 (m: hydrogen at the α-position of a vinyl group), 5.67–5.776 (m: hydrogen at the β-position of a vinyl group), 5.17–5.23 (m: hydrogen at the β-position of a vinyl group), 4.42 and 4.41 (s: methylene chain at benzyl), 3.33–3.45 (m: methylene chain at the α-position and the δ-position of Br), 1.85–1.96 (m: methylene chain at the δ-position of Br), 1.64–1.74 (m: methylene chain at the γ-position of Br)

IR spectrum (NaCl method, $cm^{-1}$) 2950 (sh.), 2860 (sh.), 1630 (sh.), 1440 (med.), 1360 (med.), 1250 (med.), 1110 (str.), 990 (str.), 910 (str.), 830 (med.), 800 (med.), 720 (med.).

PREPARATION EXAMPLE 2

Preparation 2 of 4-bromobutoxymethylstyrene

Into a 2l four-necked flask, 145 g (3.63 mol) of sodium hydroxide and 140 g of deionized water were added, and the solution was stirred to obtain a uniform solution. The solution was adjusted to room temperature, and then 608.2 g (6.75 mol) of 1,4-butandiol was added. Then, 387.6 g (2.54 mol) of chloromethylstyrene (a mixture of m-form and p-form) was dropwise added thereto by a dropping funnel. This solution as reacted at 60° C. for 6 hours with vigorous stirring. After the reaction, the organic phase was separated and thoroughly washed with water. The obtained organic product was purified by silica gel column chromatography (Wako C-200,). Firstly, the column was developed with n-hexane to remove remaining chloromethylstyrene (CMS), 1,4-bisvinylbenzyloxybutane formed as a by product and other impurities, was removed. Further, the column was developed with an eluent of n-hexane:THF=85:15 to obtain hydroxybutoxymethylstyrene as the desired product. Otherwise, by the vacuum distillation (b.p. 156° C./40 Pa) in the presence of DPPH, a pale yellow colorless transparent was obtained. The amount of 4-hydroxybutoxymethylstyrene obtained was 413 g, and the yield was 79%.

1H-NMR; 7.20–7.39 (m: aromatic hydrogen), 6.64– 6.76 (m: hydrogen at the α-position of a vinyl group), 5.69–5.78 (m: hydrogen at the β-position of a vinyl group), 5.20–5.26

(m: hydrogen at the β-position of a vinyl group), 4.49 and 4.48 (s: methylene hydrogen at benzyl), 3.60–3.63 (m: methylene hydrogen at the α-position of OH group), 3.47–3.58 (m: methylene hydrogen at the δ-position of OH group), 2.57 (s: broad, hydrogen of OH group), 1.66–1.73 (m: methylene hydrogen at the β- and γ-positions of OH group).

13C-NMR; 138.6, 137.9, 137.8, 170.0, 136.8, 136.6 (foregoing, quaternary carbon of a benzene ring)12.86, 128.0, 127.2, 126.3, 125.6 (foregoing, tertiary carbon of a benzene ring), 114.0, 113.8 (forgoing, carbon at the β-position of a vinyl group) 72.9 (carbon at benzyl), 70.4, 70.3 (methylene carbon at the δ-position of Br), 62.4 (methylene carbon at the α-position of OH group), 29.9, 29.8 (methylene carbon at the γ-position of OH group), 26.5, 26.4 (methylene carbon at the β-position of OH group).

IR spectrum (NaCl method) 3400(br.), 2950(sh.), 2880(sh.), 1630(sh.), 1480(med.), 1450(med.), 1410(med.), 1360(med.), 1090(br. str.), 1065(br. st.), 990(med.) 910(med.), 800(med.), 715(med.).

26 g (0.126 mol) of the obtained 4-hydroxybutoxymethylstyrene was put into a 300 ml four-necked flask, and 80 ml of benzene was added thereto. Then, 38.8 g (0.148 mol) of triphenylphosphine was added and dissolved thereto. Then, 28.9 g (0.150 mol) of bromine was added thereto, and the mixture was reacted at 80° C. for 56 hours. After the reaction, the reaction solution was poured into water and extracted with methylene chloride. The extract solution was dried over magnesium sulfate, and then the solvent was distilled off under reduced pressure. The obtained mixture was subjected to vacuum distillation (b.p. 130°–135° C./50 Pa) in the presence of DPPH to obtain a colorless transparent liquid. By NMR, it was confirmed to have a structure of 4-bromobutoxymethylstyrene. The yield was 67%.

PREPARATION EXAMPLE 3

Preparation of 3-bromopropoxymethylstyrene

Into a 1000 ml four-necked flask, 80 g 12.0 mol) of sodium hydroxide, 500 g (6.5 mol) of 1,3-propanediol and 1.5 g of hydroquinone were charged and reacted at 80° C. for 2 hours. Then, 250 g (1.5 mol) of chloromethylstyrene (a mixture of m-form and p-form) was dropwise added thereto over a period of 30 minutes. This mixed solution was further reacted, then cooled by a water bath to room temperature and poured into 300 ml of an aqueous sodium chloride solution (20 wt %). The organic layer was separated, and the aqueous phase was extracted with toluene. The organic phase and the toluene extract were put together, and the mixture was dried over magnesium sulfate. Then, toluene was distilled off under reduced pressure. The solution thereby obtained was subjected to vacuum distillation (b.p. 101° to 103° C./56 Pa) in the presence of DPPH (diphenylpicryl-2-hydrozyl) to obtain 3-hydroxypropoxymethylstyrene as the desired product. The yield was 60%.

192 g (1.2 mol) of the obtained 3-hydroxypropoxy methylstyrene and 55 ml of dehydrated and purified pyridine were charged into a 300 ml four-necked flask, and 108 g (0.4 mol) of phosphorus tribromide was dropwise added thereto while maintaining the mixture at −10° C. with dry ice ethanol. After completion of the dropwise addition, the mixture was stirred at room temperature for 15 hours. The reaction mixture was poured into 250 ml of an aqueous sodium chloride solution (20 wt %) and extracted with toluene. The organic layer was washed with water and a 8% sodium hydrogencarbonate aqueous solution and dried over magnesium sulfate. Then, toluene was distilled off under reduced pressure. The solution thereby obtained was subjected to vacuum distillation (b.p. 90° to 91° C./54 Pa) in the presence of DPPH to obtain 3-bromopropoxymethylstyrene as the desired product. The yield was 35%. The obtained solution was analyzed by 1H-NMR and IR spectrum.

1H-NMR: 7.18–7.40 (m: aromatic hydrogen), 6.64– 6.76 (m: hydrogen at the α-position of a vinyl group), 5.70–5.79 (m: hydrogen at the β-position of a vinyl group), 5.20–5.28 (m: hydrogen at the β-position of a vinyl group), 4.50 and 4.49 (s: methylene hydrogen at benzyl), 3.48–3.62 (m: methylene hydrogen adjacent to an ether oxygen and methylene hydrogen at the α-position adjacent to the terminal Br), 2.06–2.16 (m: methylene hydrogen at the β-position of Br)

Ir spectrum (NaCl method); 2950(sh.), 2850(sh.), 1440(wek.), 1360(med.), 1250(med.), 1110(str.), 990(med.), 910(str.), 800(sh.), 720(med.).

PREPARATION EXAMPLE 4

Preparation of 5-bromopentoxymethylstyrene

Into 1l four-necked flask, 57 g (1.425 mol) of sodium hydroxide and 57 ml of deionized water were added under cooling with ice, and a solution of 98.33 g (0.428 mol) of 1,5-dibromopentane and 9.19 g (0.0285 mol) of tetrabutylammonium bromide in 285 mol of toluene was added thereto. The temperature of the solution was set at 50° C., and 70 ml of a toluene solution of 38.25 g (0.285 mol) of vinyl benzyl alcohol (a mixture of m-form and p-form) and 30 mg of DPPH, was dropwise added thereto over a period of one hour. Most of the raw material disappeared during the dropwise addition. This mixture was reacted at 60° C. for 8 hours with vigorous stirring. After the reaction, the organic phase was separated and thoroughly washed with water. This organic phase was dried over magnesium sulfate, and then toluene was distilled off under reduced pressure. The mixture thereby obtained was subjected to vacuum distillation (b.p. 107° to 108° C./40 Pa) in the presence of DPPH to obtain a liquid of a colorless transparent solution. The obtained solution was analyzed by NMR to determine its structure. The amount of 5-bromopentoxymethylstyrene obtained, was 40.8 g, and the yield was 51%.

1H-NMR: 7.36–7.40 (m: aromatic hydrogen), 7.22– 7.31 (m: aromatic hydrogen), 6.65–6.76 (m: hydrogen at the α-position of a vinyl group), 5.70–5.78 (m: hydrogen at the β-position of a vinyl group), 5.20–5.26 (m: hydrogen at the β-position of a vinyl group), 4.48 and 4.47 (s: methylene hydrogen at benzyl), 3.44–3.48 (m: methylene hydrogen at the α- and ε-position of Br), 3.66–3.41 (m: methylene hydrogen at the α-position of oxygen), 1.80–1.91 (m: methylene hydrogen at the β-position of oxygen), 1.59–1.68 (methylene hydrogen at the β-position of Br), 1.47–1.54 (methylene hydrogen at the γ-position of Br).

IR spectrum (NaCl method); 2940(sh.), 2860(sh.), 1630(sh.), 1455(med.), 1360(str.), 1245(med.), 1105(str.), 990(med.), 910(str.), 830(med.), 800(med.) 715(med.), 645(med.), 560(med.).

PREPARATION EXAMPLE 5

Preparation of 6-bromohexoxymethylstyrene

Into a 1l four-necked flask equipped with a condenser and an isostatic dropping funnel, 100 g (2.5 mol) of sodium hydroxide and 100 ml of deionized water were added under cooling with ice to obtain a uniform solution. The temperature of the solution was adjusted to room temperature, and 500 ml of a toluene solution of 331 g (1.36 mol) of 1,6-dibromohexane and 16.2 g (50.2 mmol) of tetra-n-butyl ammonium bromide, was added thereto. The solution was adjusted to 50° C., and 100 ml of a toluene solution of 49.7 g (366 mmol) of vinyl benzyl alcohol (mixture of m-form and p-form) and 50 ml of DPPH, was dropwise added thereto over a period of 90 minutes. The mixture was reacted at 55° C. for 5 hours with vigorous stirring so that the mixture would be in a suspended state. After the reaction, the organic phase was separated and thoroughly washed with water. Toluene was distilled off under reduced pressure, and the mixture thereby obtained was subjected to vacuum distillation (b.p. 88° to 92° C./200 Pa) in the presence of DPPH to remove 1,6-dibromohexane. Then, the mixture was purified by silica gel column (Wako gel C-200) chromatography. 6-bromohexoxymethyl styrene was a slightly yellow transparent viscous solution. The structure was confirmed by 1H-NMR. The yield of 6-bromohexoxymethylstyrene was 70%.

1H-NMR: 7.20–7.41 (m: aromatic hydrogen), 6.64– 6.76 (m: hydrogen at the α-position of a vinyl group), 5.70–5.79 (m: hydrogen at the β-position of a vinyl group), 5.20–5.27 (m: hydrogen at the β-position of a vinyl group), 4.48 and 4.47 (s: methylene hydrogen at benzyl), 3.34–3.41 (m: methylene hydrogen adjacent to terminal Br), 1.82–1.92 (br.m: methylene hydrogen at the ε-position of Br), 1.36–1.47 (br.m: methylene hydrogen at the γ- and δ-positions of Br).

IR spectrum (KBr method); 2950(sh.), 2850(sh.), 1440(wek.), 1360(med.), 1250(med.), 1110(str.), 990(med.), 910(str.), 800(sh.) 720(med.).

EXAMPLE 1

Into a 500 ml four-necked flask equipped with a nitrogen gas supply tube and a condenser, 200 ml of deionized water and 50 ml of a 2% polyvinyl alcohol aqueous solution were added, and nitrogen was introduced to remove dissolved oxygen. On the other hand, a monomer phase having 46.4 g of 4-bromobutoxymethylstyrene, 1.72 g of divinyl benzene (industrial grade; purity: 56%) and 0.4 g of AIBN (azobisisobutyronitrile) dissolved, was prepared, and dissolved oxygen was removed in the same manner as in the case of the aqueous phase. The monomer solution was put into the flask and stirred at 150 rpm to form droplets of the monomer. After stirring at room temperature for 30 minutes, the temperature was raised to 70° C., followed by stirring at 70° C. for 18 hours. After the polymerization, the polymer was taken out, and the resin was washed with water and washed three times with methanol. The polymerization yield was 93%, and a slightly yellow transparent spherical resin with a charge crosslinked degree of 4 mol % was obtained.

Into a 500 ml four-necked flask equipped with a condenser, the above resin was introduced, and 500 ml of 1,4-dioxane was added thereto, followed by stirring at room temperature. To this solution, 200 ml of a 30% of trimethylamine aqueous solution was added, and the reaction was carried out at 50° C. for 10 hours to introduce trimethylammonium groups. After the reaction, the polymer was taken out and thoroughly washed with water and methanol. To convert the counter ion of this anion exchange resin from a bromide ion to a chlorine ion (Cl form), 10 times by volume of 4 wt % sodium chloride aqueous solution was passed through the resin. The following properties of the resin of Cl form were measured. The average particle size was 750 μm.

Neutral salt splitting capacity: 3.42 meq/g

Neutral salt splitting capacity: 0.832 meq/ml

Water content: 57.0%

Degree of swelling: 4.11 ml/g

The IR spectrum of the anion exchange resin obtained in Example 1 was as follows.

(KBr method) (counter ion X is Cl form) 3450(br.), (sh.), 2870(sh.), 1640(br.), 1480(str.), 1360(med.), 1110(str.), 970(med.), 910(med.), 800(med.). (KBr method) (counter ion X is OH form) 3400(br.), 2950(sh.), 2870(sh.), 1650(br.), 1480(str.), 1450(str.), 1370(med.), 1090(str.), 970(med.), 910(med.), 790(med.).

EXAMPLE 2

The reaction was carried out in the same manner as in Example 1 except that the amount of 4-bromobutoxymethylstyrene was changed to 44.7 g, and the amount of divinyl benzene (industrial grade) was changed to 2.60 g, to obtain an anion exchange resin having charge crosslinked degree of 6 mol % and an average particle size of 730 μm. The polymerization yield was 91%.

The properties were as follows.

Neutral salt splitting capacity: 3.21 meq/g

Neutral salt splitting capacity: 0.919 meq/ml

Water content: 51.0%

Degree of swelling: 3.49 ml/g

EXAMPLE 3

The reaction was carried out in the same manner as in Example 1 except that the amount of 4-bromobutoxymethylstyrene was changed to 42.9 g, and the amount of divinylbenzene was changed to 3.46 g, to obtain an anion exchange resin having a charge crosslinked degree of 8 mol % and an average particle size of 750 μm. The polymerization yield was 93%.

The properties were as follows.

Neutral salt splitting capacity: 3.32 meq/g

Neutral salt splitting capacity: 1.02 meq/ml

Water content: 44.5%

Degree of swelling: 3.25 ml/g

EXAMPLE 4

A chloromethylstyrene-divinylbenzene copolymer was prepared by polymerizing a monomer solution prepared so that the content of divinylbenzene would be 4 mol %, in accordance with the literature (Polymer, 14, July 1973 330–332). Further, the chloromethyl group is converted to an acetic acid ester derivative in accordance with the above literature, followed by hydrolysis with an aqueous sodium hydroxide solution to obtain a vinyl benzyl alcohol-divinylbenzene copolymer.

Into a 1l four-necked flask, 50 g of the above copolymer, 500 ml of 1,4-dioxane and 200 g (0.926 mol) of 1,4-dibromobutane were added and stirred at 50° C. for 30 minutes to let the polymer swell. Then, 31 g (0.574 mol) of sodium methoxide was added thereto, and the mixture was reacted at 70° C. for 10 hours. After the reaction, the polymer was taken out and thoroughly washed with methanol. Then, the polymer was washed with water.

Into a 500 ml four-necked flask, the above resin and 500 ml of methanol were added and stirred at room temperature. To this solution, 200 ml of a 30% trimethylamine aqueous solution was added, and an amination reaction was carried out at 50° C. for 10 hours. After the reaction, the polymer was taken out and thoroughly washed with water. To convert the counter ion to a Cl form, ten times by volume of a 4% sodium chloride aqueous solution was passed through the resin. The average particle size of the obtained resin was 560 μm.

The properties were as follows.

Neutral salt splitting capacity: 2.32 meq/g

Neutral salt splitting capacity: 0.71 meq/ml

Water content: 44.5%

Degree of swelling: 3.25 ml/g

EXAMPLE 5

The reaction was carried out in the same manner as in Example 1 except that 46.4 g 5-bromopentoxymethylstyrene was used instead of 4-bromobutoxymethylstyrene and the amount of divinylbenzene was changed to 1.64 g to obtain an anion exchange resin having a charge crosslinked degree of 4 mol % and an average particle size of 700 μm. The polymerization yield was 90%.

The properties were as follows.

Neutral salt splitting capacity: 2.61 meq/g

Neutral salt splitting capacity: 0.74 meq/ml

Water content: 51.7%

Degree of swelling: 3.54 ml/g

EXAMPLE 6

The reaction was carried out in the same manner as in Example 2 except that 44.7 g of 5-bromopentoxymethylstyrene was used, and the amount of divinylbenzene was changed to 2.47 g to obtain an anion exchange resin having a charge crosslinked degree of 6 mol % and an average particle size of 720 μm. The polymerization yield was 91%.

The properties were as follows.

Neutral salt splitting capacity: 3.00 meq/g

Neutral salt splitting capacity: 0.93 meq/ml

Water content: 51.7%

Degree of swelling: 3.25 ml/g

EXAMPLE 7

The reaction was carried out in the same manner as in Example 1 except that 6-bromohexoxymethylstyrene was used instead of 4-bromobutoxymethylstyrene, and the amount of divinylbenzene was changed to 1.56 g to obtain an anion exchange resin having a charge crosslinked degree of 4 mol % and an average particle size of 680 μm. The polymerization yield was 89%.

The properties were as follows.

Neutral salt splitting capacity: 3.00 meq/g

Neutral salt splitting capacity: 0.87 meq/ml

Water content: 57.5%

Degree of swelling: 3.47 ml/g

EXAMPLE 8

A chloromethylstyrene-divinylbenzene copolymer was prepared by polymerizing a monomer solution prepared so that the content of divinylbenzene would be 3.2 mol %, in accordance with a literature (Polymer, 14, July 1973 330–332). The polymerization yield of the obtained copolymer was 83%. The degree of swelling of this copolymer in dimethylformamide (DMF) was 6.90 ml/g (dry copolymer).

Into a 300 ml four-necked flask, 20 ml of dimethylformamide, 17.64 g (0.195 mol) of 1,4-butanediol and 2.61 g (0.065 mol) of sodium hydride having a purity of 60% were added and stirred at room temperature for one four. Then, 10 g of the above copolymer swelled in 80 ml of dimethylformamide, was added thereto, and the mixture was reacted at 60° C. for 25 hours in a dry nitrogen stream. After the reaction, the hydroxybutoxylated copolymer was taken out, washed with water and thoroughly washed with acetone. Then, the polymer was further washed with water. This polymer was dried under vacuum.

In a 300 ml four-necked flask, 5 g of the hydroxybutoxylated copolymer was swelled with 30 ml of dimethylformamide at room temperature, and 5.75 g of pyridine was added thereto, followed by cooling with ice. Under cooling with ice, 8.70 g (0.073 mol) of thionyl chloride was dropwise added over a period of 30 minutes with stirring. After completion of the dropwise addition, the mixture was reacted at 70° C. for 5 hours. After the reaction, the chlorobutoxylated copolymer was taken out, then washed with water and thoroughly washed with acetone. Then, the polymer was further washed with water.

Into a stainless steel autoclave tube, 5 g of the chlorobutoxylated copolymer was introduced, and 25 ml of a 30% aqueous solution of trimethylamine and 10 ml of methanol were added. Then, an amination reaction was conducted at 80° C. for 6 hours under pressure. After the reaction, the polymer was taken out and thoroughly washed with water. To convert the counter ion to a Cl form, ten times by volume of a 4% sodium chloride solution was passed through the resin. The properties of the obtained resin were as follows.

Neutral salt splitting capacity: 2.46 meq/g

Neutral salt splitting capacity: 0.58 meq/ml

Water content: 63.3%

COMPARATIVE EXAMPLE 1

The reaction was carried out in the same manner as in Example 1 except that the 46.4 g of 3-bromopropoxymethylstyrene was used instead of 4-bromobutoxymethylstyrene, and divinylbenzene (industrial grade) was changed to 1.83 g, to obtain an anion exchange resin having a charge crosslinked degree of 4 mol % and an average particle size of 610 μm. The polymerization yield was 86%.

The properties were as follows.

Neutral salt splitting capacity: 3.38 meq/g

Neutral salt splitting capacity: 0.74 meq/ml

Water content: 60.8%

Degree of swelling: 4.57 ml/g

COMPARATIVE EXAMPLE 2

The reaction was carried out in the same manner as in Example 2 except that the 44.7 g 3-bromopropoxymethylstyrene was used and divinylbenzene was changed to 2.74 g, to obtain an anion exchange resin having a charge crosslinked degree of 6 mol % and an average particle size of 650 μm. The polymerization yield was 83%.

The properties were as follows.

Neutral salt splitting capacity: 3.33 meq/g

Neutral salt splitting capacity: 0.88 meq/ml

Water content: 52.6%

Degree of swelling: 3.80 ml/g

COMPARATIVE EXAMPLE 3

4 mol % Type I Gel Form Anion Exchange Resin

The reaction was carried out in the same manner as in Example 1 except that instead of 4-bromobutoxymethylstyrene, chloromethylstyrene was used.

COMPARATIVE EXAMPLE 4

4 mol % Type I Gel Form Anion Exchange Resin

The reaction was carried out in the same manner as in Example 1 except that instead of 4-bromobutoxymethylstyrene, 2-bromoethylstyrene (prepared by a conventional method using bromoethylbenzene as the starting material) was used.

COMPARATIVE EXAMPLE 5

4 mol % Crosslinked Butylene Chain-Containing Type Anion Exchange Resin

The reaction was carried out in the same manner as in Example 1 except that instead of 4-bromobutoxymethylstyrene, 4-bromobutylstyrene was used.

COMPARATIVE EXAMPLE 6

4 mol % Crosslinked Butylene Chain-Containing I Type Anion Exchange Resin

The reaction was carried out in the same manner as in Example 2 except that instead of 4-bromobutoxymethylstyrene, 4-bromobutylstyrene was used.

COMPARATIVE EXAMPLE 7

4% Crosslinked Heptylene Chain-Containing I Type Anion Exchange Resin

The reaction was carried out in the same manner as in Example 1 except that instead of 4-bromobutoxymethylstyrene, 7-bromoheptylstyrene was used.

Heat Resistance Test 1 of Anion Exchange Resins

The anion exchangers prepared in Examples 1, 2 and 5 to 9 and the anion exchange resins of Comparative Examples 1 to 5 were employed. Through each anion exchange resin, ten times by volume of a 4% sodium chloride aqueous solution was passed to convert the counter ion to a Cl form. Then, 50 ml of a such a resin was taken. Through such a resin, 500 ml of a 2N sodium hydroxide aqueous solution was passed to regenerate it to OH form, and the volume was measured.

The obtained resin was put into a glass autoclave tube and 0.8 times by volume of deionized water was added to the OH form resin. To remove dissolved oxygen in the tube, nitrogen gas was passed for one hour under a condition heated to 50° C.

This autoclave tube was immersed in an oil bath and left to stand at 100° C. for 30 days or 90 days, whereupon the resin was taken out and regenerated to OH form by passing 500 ml of a 2N sodium hydroxide aqueous solution therethrough. The volume of the resin after regeneration was measured. Further, 5 times by volume of a 4% sodium chloride aqueous solution was passed therethrough to convert the counter ion to a Cl form. Then, the volume of the resin and the neutral salt splitting capacity of the resin were measured, and the remaining ratio was calculated. The results of its heat resistance test are shown in Table 1.

The heat resistance test at 120° C. and 140° C., respectively, were carried out in the same manner as above. The results were shown in Table 2 and Table 3, respectively.

TABLE 1

(100° C.)

| Anion exchange resin[1] | Crosslinked degree | Spacer[2] | Remaining ratio (%)[3] 30 days | 90 days |
|---|---|---|---|---|
| Example 1 | 4 | $CH_2O(CH_2)_4$ | 94 | 75 |
| Example 2 | 6 | $CH_2O(CH_2)_4$ | 89 | 74 |
| Example 5 | 4 | $CH_2O(CH_2)_5$ | 100 | |
| Example 6 | 6 | $CH_2O(CH_2)_5$ | 99 | |
| Example 7 | 4 | $CH_2O(CH_2)_6$ | 98 | 83 |
| Comparative Example 1 | 4 | $CH_2O(CH_2)_3$ | 10 | |
| Comparative Example 2 | 6 | $CH_2O(CH_2)_3$ | 11 | |
| Comparative Example 3 | 4 | $CH_2$ | 63 | 55 |
| Comparative Example 4 | 4 | $(CH_2)_2$ | 0.4 | |
| Comparative Example 5 | 4 | $(CH_2)_4$ | 80 | |
| Comparative Example 6 | 6 | $(CH_2)_4$ | 71 | |
| Comparative Example 7 | 4 | $(CH_2)_7$ | 92 | |

[1]The ion exchange groups of the anion exchange resins are trimethylammonium groups in all cases.
[2]Spacer: The spacer means a functional group connecting the anion exchange group and the benzene ring.
[3]Remaining ratio: The remaining ratio is represented by the following formula: Remaining ratio (%) =(the neutral salt splitting capacity meq/ml after the heat resistance test × the volume of the Cl form resin after the test) ÷ (salt splitting capacity meq/ml before the heat resistance test) × (the volume of the Cl form resin before the test) × 100
The vacant space means "not tested".

(1) The ion exchange groups of the anion exchange resins are trimethylammonium groups in all cases.

(2) Spacer: The spacer means a functional group connecting the anion exchange group and the benzene ring.

(3) Remaining ratio: The remaining ratio is represented by the following formula:

Remaining ratio (%)=(the neutral salt splitting capacity meq/ml after the heat resistance test×the volume of the Cl form resin after the test)÷(salt splitting capacity meq/ml before the heat resistance test)×(the volume of the Cl form resin before the test)×100

The vacant space means "not tested".

TABLE 2

| | (120° C.) | | | |
|---|---|---|---|---|
| Anion exchange resin | Cross-linked degree (mol %) | Spacer | Remaining ratio (%) 30 days | 90 days |
| Example 1 | 4 | $-CH_2-O-(CH_2)_4-$ | 81 | 68 |
| Example 7 | 4 | $-CH_2-O-(CH_2)_6-$ | 83 | 55 |
| Comparative Example 3 | 4 | $-CH_2-$ | 16 | 3 |

TABLE 3

| | (140° C.) | | | |
|---|---|---|---|---|
| Anion exchange resin | Cross-linked degree (mol %) | Spacer | Remaining ratio (%) 30 days | 90 days |
| Example 1 | 4 | $-CH_2-O-(CH_2)_4-$ | 21 | — |
| Example 7 | 4 | $-CH_2-O-(CH_2)_6-$ | 39 | — |
| Comparative Example 3 | 4 | $-CH_2-$ | 1 | — |

From Tables 1 to 3, it is evident that the anion exchangers of the present invention are superior in the heat resistance to the conventional exchangers.

Elution Test From Resins

Anion exchangers prepared in Example 2 and Comparative Example 1 were used.

The resin with the counter ion converted to Cl form and the resin with the counter ion converted to OH form were, respectively, sampled in an amount of 25 ml and subjected to removal of attached water by a centrifugal separation. Each of such samples was added to 100 ml of each test solution put in a 300 ml of Eriemayer flask, and the flask was sealed with a stopper and left to stand at 30° C. for 30 days. For each test solution, no removal of dissolved oxygen by e.g. flushing with nitrogen was carried out.

TOC (total organic carbon) contained in each test solution was measured after the test by a TOC analyzer. The results are shown in Table 4. In the Table, the unit of the numerical values is ppm.

TABLE 4

| | Anion exchanger TOC (ppm) | | | |
|---|---|---|---|---|
| | Example 2 | | Comparative Example 1 | |
| Test solution | OH form | Cl form | OH form | Cl form |
| Deionized water | 24 | 5 | 183 | 35 |
| 1N-NaOH | 23 | — | 128 | — |

Radiation Resistance Test

Deterioration of the performance of the crosslinked anion exchanger prepared in Example 2 by radiation, was measured. Each anion exchanger was regenerated to OH form. The prepared amount was 70 ml. Further, attached water was removed by suction filtration, and the anion exchanger was placed in a 200 ml stainless steel angular container, and a flat cover made also of stainless steel was put thereon for sealing. Three sets of exactly the same samples were prepared. From above these angular containers, $^{60}Co$ gamma rays were uniformly irradiated to the respective samples. For every angular container, the dose of $^{60}Co$ gamma rays was $10^3$ Gy, $10^4$ Gy, $10^5$ Gy and $10^6$ Gy. After irradiation, each sample was completely regenerated to OH form and then converted to Cl form by passing a sodium chloride solution therethrough, whereupon the neutral slat splitting capacity was measured, and the neutral salt splitting capacity-maintaining ratio was calculated from the ratio to the neutral salt splitting capacity prior to irradiation of the gamma rays. The results are shown in Table 5. For the purpose of comparison, using DIAION® SA10A (manufactured by Mitsubishi Chemical Corporation) as a commercially available strongly basic anion exchanger derived from styrene and divinylbenzene.

TABLE 5

| | Neutral salt splitting capacity-maintaining ratio (%) | | | |
|---|---|---|---|---|
| Anion exchanger | $10^3$ Gy | $10^4$ Gy | $10^5$ Gy | $10^6$ Gy |
| Example 2 | 99 | 98 | 93 | 73 |
| Commercially available anion exchanger | 98 | 98 | 93 | 60 |

As is evident from the above Table, with the crosslinked anion exchanger of the present invention, decrease in the neutral salt splitting capacity against radiation is small as compared with the conventional crosslinked anion exchanger, and thus the anion exchanger of the present invention is useful for the treatment of radioactive waste water.

Demineralization Test

The test was carried out using the crosslinked anion exchanger prepared in Example 2

Through the anion exchanger of Example 2, ten times by volume of a 4% sodium chloride aqueous solution was passed to convert the counter ion to Cl form. Then, 450 ml of the anion exchanger was taken and packed into a cylindrical column having an inner diameter of 30 mm and a length of 1000 mm, and 1350 ml of a 1N sodium hydroxide aqueous solution was passed therethrough. Then, 2700 ml of deionized water was passed therethrough over a period of 50 minutes. Then, an aqueous solution having following composition was contacted to 1000 ml of a regenerated form of cation exchange resin, and then passed therethrough whereby the electrical conductivity was measured at the outlet of the column.

Test Water

Sodium ion: 210 ppm
Calcium ion: 140 ppm
Silica: 87.5 ppm

Sulfuric acid ion: 210 ppm

Chlorine ion: 140 ppm (Each concentration was calculated as calcium carbonate.)

Results

The electrical conductivity of the treated water was 0.3 µS/cm at a constant flow, and 103t of the test water per 1000 ml of ion exchanger of Example 2 was demineralized until the electrical conductivity reached 1.0 µS/cm.

What is claimed is:

1. A method for treating water or an aqueous solution to remove anionic substances, negatively charged microparticles, colored substances, radioactive substances or silica from the water or aqueous solution, which comprises contacting the water or the aqueous solution to be treated with a strongly basic anion exchanger made of a crosslinked polymer having a constituting unit of the following formula (I):

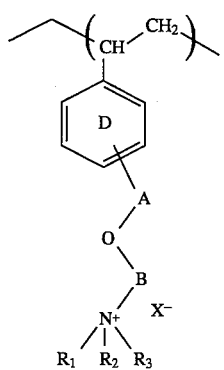

wherein A is a $C_{1-2}$ linear alkylene group, B is a $C_{4-8}$ linear alkylene group, each of $R_1$, $R_2$ and $R_3$, which may be the same or different, is a $C_{1-4}$ alkyl group or a $C_{2-4}$ alkanol group, X is a counter ion coordinated on the ammonium group, and the benzene ring D may have an alkyl group or a halogen atom as a substituent.

2. The method according to claim 1, wherein in the formula (I), A is a methylene group, and B is a $C_{4-6}$ linear alkylene group.

3. The method according to claim 1, wherein the crosslinked polymer is represented by the formula (II):

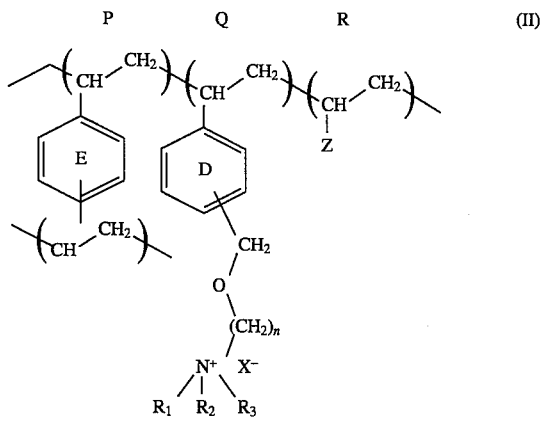

wherein n is an integer of from 4 to 8, each of R1, R2 and R3 which may be the same or different, is a $C_{1-4}$ alkyl group or a $C_{2-4}$ alkanol group, X is a counter ion coordinated on the ammonium group, each of the benzene rings D and E may have an alkyl group or a halogen atom as a substituent, and

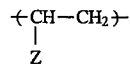

is a third polymerizable monomer residue, and wherein the constituting unit Q is from 5 to 99.9 mol %, the constituting unit P is from 50 to 0.1 mol % and the constituting unit R is from 0 to 50 mol %, based on the crosslinked polymer.

4. The method according to claim 1, wherein the water to be treated is hot water of at least 60° C.

5. The method according to claim 1, wherein the water to be treated is water contaminated with a radioactive substance.

6. The method according to claim 1, wherein the treated water is then used as a heat exchanging medium or a medium for energy conversion in an electricity generating installation.

7. The method according to claim 1, wherein the water to be treated is water containing a silica component.

8. The method according to claim 1, wherein the water to be treated is water containing a colored component.

9. The method according to any one of claims 1 to 4, wherein the treated water is then used for production of extra pure water.

* * * * *